(12) United States Patent
Weingartner et al.

(10) Patent No.: US 12,062,157 B2
(45) Date of Patent: Aug. 13, 2024

(54) SYSTEMS AND METHODS FOR EMPLOYING INVISIBLE FIDUCIALS FOR ALIGNING SCANS OR IMAGES TO FORM COMPOSITE IMAGES, MODELS, OR DATASETS

(71) Applicant: Illuscio, Inc., Culver City, CA (US)

(72) Inventors: Mark Weingartner, Woodland Hills, CA (US); Robert Monaghan, Ventura, CA (US)

(73) Assignee: Illuscio, Inc., Culver City, CA (US)

( * ) Notice: Subject to any disclaimer, the term of this patent is extended or adjusted under 35 U.S.C. 154(b) by 0 days.

(21) Appl. No.: 18/458,569

(22) Filed: Aug. 30, 2023

(65) Prior Publication Data

US 2024/0112306 A1     Apr. 4, 2024

Related U.S. Application Data

(63) Continuation of application No. 17/937,053, filed on Sep. 30, 2022, now Pat. No. 11,756,178.

(51) Int. Cl.
| | |
|---|---|
| *G06T 5/50* | (2006.01) |
| *G06T 7/50* | (2017.01) |
| *G06T 7/90* | (2017.01) |
| *G06T 17/00* | (2006.01) |
| *G06V 10/24* | (2022.01) |
| *G06V 10/50* | (2022.01) |

(52) U.S. Cl.
CPC ............ *G06T 5/50* (2013.01); *G06T 7/50* (2017.01); *G06T 7/90* (2017.01); *G06T 17/00* (2013.01); *G06V 10/245* (2022.01); *G06V 10/507* (2022.01); *G06T 2207/10024* (2013.01); *G06T 2207/10048* (2013.01); *G06T 2207/20221* (2013.01); *G06T 2207/30204* (2013.01)

(58) Field of Classification Search
CPC .... G06T 5/50; G06T 7/50; G06T 7/90; G06T 17/00; G06T 2207/10024; G06T 2207/10048; G06T 2207/20221; G06T 2207/30204; G06V 10/507; G06V 10/245
USPC ......................................................... 345/629
See application file for complete search history.

(56) References Cited

U.S. PATENT DOCUMENTS

| | | | |
|---|---|---|---|
| 9,916,506 B1 * | 3/2018 | Davis ..................... | G06V 10/22 |
| 2009/0326383 A1 * | 12/2009 | Barnes .................. | A61B 5/417 |
| | | | 850/1 |

(Continued)

*Primary Examiner* — Hai Tao Sun
(74) *Attorney, Agent, or Firm* — Ansari Katiraei LLP; Arman Katiraei; Sadiq Ansari

(57) ABSTRACT

Disclosed is a system and associated methods for generating a composite image from scans or images that are aligned using invisible fiducials. The invisible fiducial is a transparent substance or a projected specific wavelength that is applied to and changes reflectivity of a surface at the specific wavelength without interfering with a capture of positions or visible color characteristics across the surface. The system performs first and second capture of a scene with the surface, and detects a position of the invisible fiducial in each capture based on values measured across the specific wavelength that satisfy a threshold associated with the invisible fiducial. The system aligns the first capture with the second capture based on the detected positions of the invisible fiducial, and generates a composite image by merging or combining the positions or visible color characteristics from the aligned captures.

13 Claims, 9 Drawing Sheets

(56) References Cited

U.S. PATENT DOCUMENTS

| | | |
|---|---|---|
| 2015/0228112 A1 | 8/2015 | Brewington et al. |
| 2019/0228204 A1 | 7/2019 | Park et al. |
| 2021/0142504 A1* | 5/2021 | Dascal .................... G06T 11/00 |
| 2021/0169324 A1 | 6/2021 | Tripathi et al. |

* cited by examiner

SYSTEMS AND METHODS FOR EMPLOYING INVISIBLE FIDUCIALS FOR ALIGNING SCANS OR IMAGES TO FORM COMPOSITE IMAGES, MODELS, OR DATASETS

CLAIM OF BENEFIT TO RELATED APPLICATIONS

This application is a continuation of U.S. nonprovisional application Ser. No. 17/937,053 with the title "Systems and Methods for Employing Invisible Fiducials for Aligning Scans or Images to form Composite Images, Models, or Datasets", filed Sep. 30, 2022. The contents of application Ser. No. 17/937,053 are hereby incorporated by reference.

BACKGROUND

Generating a single composite image or model of an object or an environment from multiples scans and/or images is a computationally expensive and challenging operation. The different scans and/or images capture the object or environment from different angles, positions, and/or views, and must therefore be aligned based on common visual features within two or more of the scans and/or images before the aligned image data can be combined to create the single composie image.

Some scans or images may have a repeating pattern that creates too many of the same common visual features. Consequently, scans or images may be incorrectly aligned based on common visual features that are appear to be the same distant visual feature of the object or environment but that are vertically, horizontally, or otherwise offset from one another.

Conversely, some scans or images capture a uniform pattern, structure, and/or coloring that does not provide enough contrasting detail or differentiable common visual features to align the scans or images. In this case, there are insufficient distinct reference points to accurately determine how to align the different scans or images.

Any imprecision in the resulting alignment could lead to an incorrect merging of image data from the different scans or images to the single composite image or model. The incorrectly merged image data may distort geometries, shapes, or forms of the object or within the environment, and produce coloring that is incorrectly mapped to parts of the object or environment.

DETAILED DESCRIPTION OF PREFERRED EMBODIMENTS

The following detailed description refers to the accompanying drawings. The same reference numbers in different drawings may identify the same or similar elements.

Provided are systems and methods for employing invisible fiducials or unique differentiating features that do not appear, interfere, or distort the positional or visible color capture of an object or environment for the alignment of different scans or images taken of the object or environment from different angles or positions, and for the generation of composite images, models, or datasets from the aligned scans or images. The systems and methods include applying the invisible fiducials at specific points about the object or environment. The invisible fiducials may be applied using a chemical, coating, and/or other material that is highly reflective or absorptive of a specific wavelength that does not affect the overall albedo or capture of visible light, or may be applied by projecting a specific wavelength that does not affect the overall albedo or capture of visible light at the specific points about the object or environment using a projector. The systems and methods include scanning or imaging the object or environment from different positions to capture the spatial positioning and/or coloring of the object or environment with the invisible fiducials producing differentiable and/or unique data values in the captured data that do not interfere with, distort, or block the positional measurements or visible color values returned during the scanning or imaging. The systems and methods further include aligning the scans or images taken from the different positions based on the locations of the differentiable and/or unique data values associated with the invisible fiducials within each scan or image, and generating a single composite image, model, or dataset by aggregating the positional measurements or color values from the perfectly aligned scans or images into the single composite image, model, or dataset.

Figure 1:
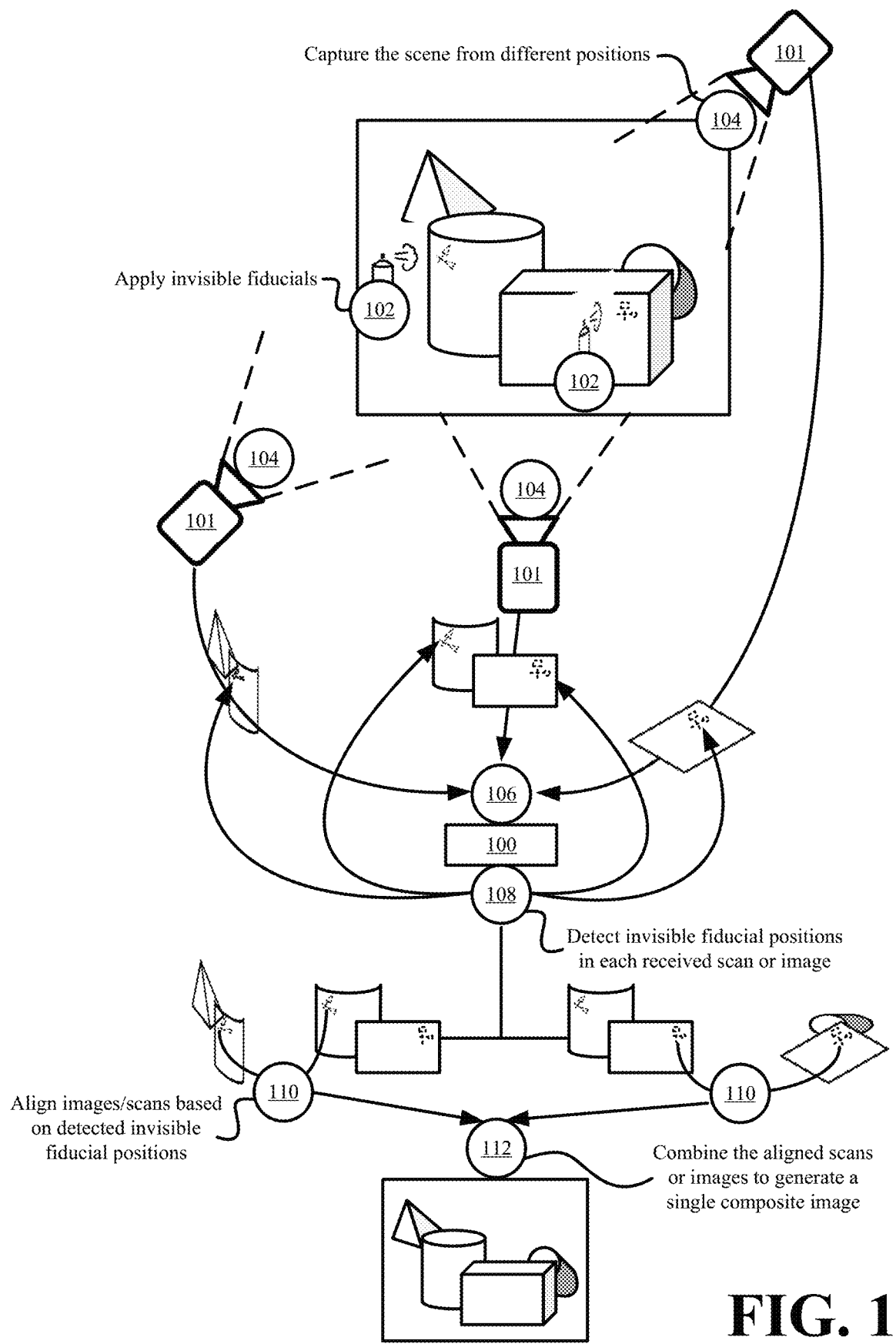
FIG. 1 illustrates an example of generating a composite image from multiple scans or images that are aligned using invisible fiducials in accordance with some embodiments presented herein.

FIG. 1 illustrates an example of generating a composite image from multiple scans or images that are aligned using invisible fiducials in accordance with some embodiments presented herein. As shown in FIG. 1, a user applies (at 102) the invisible fiducials at different positions in a scene. Applying (at 102) the invisible fiducials includes spraying, brushing on, and/or otherwise placing a transparent chemical, coating, and/or other material onto different surfaces at different positions in the scene, wherein the invisible fiducials do not distort, interfere with, or alter the form, texture, dimensions, or visible colors of the different surfaces. In other words, the invisible fiducials do not change the reflective or absorptive properties of the surfaces over the red, green, and blue ("RGB") and/or visible light bands of the electromagnetic spectrum. However, applying (at 102) the invisible fiducials adds a substance that is highly absorptive or highly reflective of another wavelength or band of the electromagnetic spectrum, or a specific narrow wavelength within the visible light bands that does not create a noticeable change to the overall RGB characteristics. For instance, the color red is produced by wavelengths spanning 610 to 700 nanometers, and the invisible fiducials may increase the reflectance at only the 700 nanometer wavelength such that the overall change to the color red is imperceptible to the human eye. In any case, the invisible fiducials temporarily adhere to the surfaces where applied (at 102).

In some other embodiments, the invisible fiducials are projected onto the different positions in the scene using one or more wavelengths of the electromagnetic spectrum that do not change the reflective or absorptive properties of the surfaces over RGB and/or visible light bands of the electromagnetic spectrum. However, the projected one or more wavelengths are selected to be highly absorptive or reflective in those one or more wavelengths, and therefore differentiable from the absorption or reflection produced at those one or more wavelengths by surfaces in the scene that are not applied with an invisible fiducial.

One or more imaging devices 101 capture (at 104) the scene from different positions. Imaging devices 101 capture (at 104) the scene from different positions to ensure that the entirety of the scene is scanned or imaged when the scene does not fit in the imaging device field-of-view, or when parts of the scene are not exposed to imaging devices 101 from certain positions. For instance, a three-dimensional ("3D") capture requires an object to be scanned and/or imaged from all sides (e.g., front, left, right, and back).

In some embodiments, imaging devices 101 include a three-dimensional ("3D") or depth-sensing camera, Light Detection and Ranging ("LiDAR") sensor, Magnetic Resonance Imaging ("MRI") device, Positron Emission Tomography ("PET") scanning device, Computerized Tomography ("CT") scanning device, time-of-flight device, structured or patterned light imaging device, and/or other imaging equipment that emits lasers, light, sound, and/or other signaling to accurately measure the position of each point, surface, or feature within the scene. Accordingly, capturing (at 104) the scene includes generating a 3D model or point cloud with data points, meshes, polygons, or other primitives positioned in a 3D space according to the detected positions of each point, surface, or feature measured in the scene by imaging devices 101.

In some embodiments, imaging devices 101 include visible light or hyperspectral cameras with sensors that generate two-dimensional ("2D") images based on captured coloring and/or intensity values or reflectivity across various bands of the electromagnetic spectrum. For instance, the sensors may include different sets of photosites with each photosite in a particular set of photosites capturing a specific RGB color component or different hyperspectral wavelength than other photosites in the particular set of photosites. The image data from the different sets of photosites is processed using a demosaicing, debayering, and/or other technique to derive a color value (e.g., RGB values) for each imaged point, surface, or feature that corresponds to a pixel of the image.

Imaging devices 101 also measure an intensity value for the specific wavelength or band of the electromagnetic spectrum that is reflected or absorbed by the invisible fiducials. In some embodiments, the specific wavelength or band reflected or absorbed by the invisible fiducials is a narrow subset of the same wavelengths used by imaging devices 101 to measure the positions or to capture the color components of the scene. In some other embodiments, the specific wavelength or band reflected or absorbed by the invisible fiducials is different than the wavelengths or bands used by imaging devices 101. In any case, the sensors of imaging devices 101 generate intensity values, return values, and/or other measured values for a set of wavelengths or bands that includes the specific wavelength or band reflected or absorbed by the invisible fiducials as well as other wavelengths or bands used to obtain the positional measurements and/or color components across the scene.

For instance, for a laser scanner that uses near-infrared lasers with wavelengths between 800 to 900 nanometers to measure distance, the invisible fiducials have a transparent material composition that absorbs or reflects at least 90% of a narrow 1-5 nanometer wavelength within the emitted range (e.g., 890-895 nanometers). Alternatively, the invisible fiducials may have a transparent material composition that absorbs or reflects at least 90% of the entire wavelength emitted by the laser scanner when the scene, object, or environment being scanned is composed of materials that are less absorptive or reflective of the entire wavelength emitted by the laser scanner. Accordingly, the measurements (e.g., intensity values) obtained for surfaces of the scene coated with the invisible fiducials are differentiable from the measurements produced by other surfaces of the scene that are not coated with the invisible fiducials.

For an imaging camera that captures a set of hyperspectral bands or the RGB color components, the invisible fiducials have a transparent material composition that absorbs or reflects at least 90% of a specific band or narrow wavelength of the captured hyperspectral bands or the RGB color components that does not interfere with the color capture and/or is not used to define the visual characteristics of the imaged surfaces. For instance, a particular band within the set of hyperspectral bands captured by the sensors of imaging devices 101 may not be used for capturing the color components of the scene, and the invisible fiducials may be formulated to be highly reflective or absorptive in only that particular band. Alternatively, the invisible fiducials may be formulated to be highly reflective or absorptive of a very specific wavelength in the red visible color band such that the overall impact to the measured red color component is negligible or imperceptible by the human eye.

Image generation system 100 receives (at 106) the scene scans or images that are captured (at 104) by imaging devices 101 from the different positions. Image generation system 100 detects (at 108) the positions of the invisible fiducials within each scan or image by analyzing the scans or images for intensity values that are in range of expected values for the one or more wavelengths that are reflected or absorbed by the invisible fiducials. In some embodiments, image generation system 100 is configured with the specific wavelengths that the invisible fiducials absorb or reflect, and detecting (at 108) the invisible fiducial positions includes analyzing the scans or images for values captured in those specific wavelengths that indicate the highly absorptive or reflective properties of the invisible fiducials. In some other embodiments, the wavelengths absorbed or reflected by the invisible fiducials are the same as those used to measure distance, color components, and/or other hyperspectral data. In some such embodiments, detecting (at 108) the invisible fiducial positions includes identifying values measured by imaging devices 101 on surfaces that are coated with the invisible fiducials that have outlying, extreme, or otherwise differentiable values relative to other surfaces that are not coated with the invisible fiducials.

Image generation system 100 aligns (at 110) the scans or images based on the detected (at 108) positions of the invisible fiducials. Aligning (at 110) the scans or images includes rotating, sizing, and moving the scans or images until the same invisible fiducials captured in different scans or image are aligned. To aid in the alignment (at 110), the invisible fiducials may be applied (at 102) onto different surfaces of the scene with different shapes that differentiate one invisible fiducial from another. To further aid in the alignment (at 110) each invisible fiducial may have distinct markers or characteristics on different sides so that the orientation of the invisible fiducial is readily discernable based on the positions of the distinct markers or characteristics. To further aid in the alignment (at 110), image generation system 100 may use color data or positional measurements that surround the invisible fiducials to ensure that the same invisible fiducials are being aligned.

Image generation system 100 combines (at 112) the data from the aligned (at 110) scans or images to generate a single composite image, model, or dataset. The single composite image is a complete and geometrically and visually accurate visualization of the scene that excludes the invisible fiducials but retains the positioning and color data of the structures and surfaces that were coated with the invisible fiducials.

In some embodiments, combining (at 112) the data includes constructing a 3D model by merging data points, meshes, polygons, and/or other primitives from different scans into a common 3D space of the single composite image. For instance, combining (at 112) the data includes mapping data points from different point clouds into a single point cloud. In some other embodiments, combining (at 112) the data includes merging color data captured in different images to form a single panoramic image, or performing photogrammetry to derive a 3D model from the aligned 2D capture of the same scene from different angles. In still some other embodiments, combining (at 112) the data includes constructing an accurate 3D model of an object from the positional data captured in one or more 3D scans of the scene, and accurately mapping color and/or other hyperspectral properties from different positions in the scene captured in one or more 2D images onto the exact corresponding positions of the 3D model based on the alignment (at 110) of the 2D images to the 3D scans using the invisible fiducials.

The invisible fiducials provide image generation system 100 with specific non-repeating identifiable reference points for perfectly aligning the scans or images without having to rely on visual features of the scene. The invisible fiducials eliminate the misalignment issues that commonly occur when relying solely on the visual features that are captured in the scans or images. The visual features may be distorted or skewed when captured from the different imaging device 101 positions, and may therefore lead to incorrect alignment of the scans or images. The scene may also contain visual features that are either not unique or that appear in multiple places making it difficult for the user or system performing the alignment (e.g., image generation system 100) to identify which specific feature is captured in the different scans or images. Accordingly, the invisible fiducials provide unique reference points for aligning scans or images that include repeating visual features or visual features of uniform structures, textures, and/or coloring.

Figure 2:
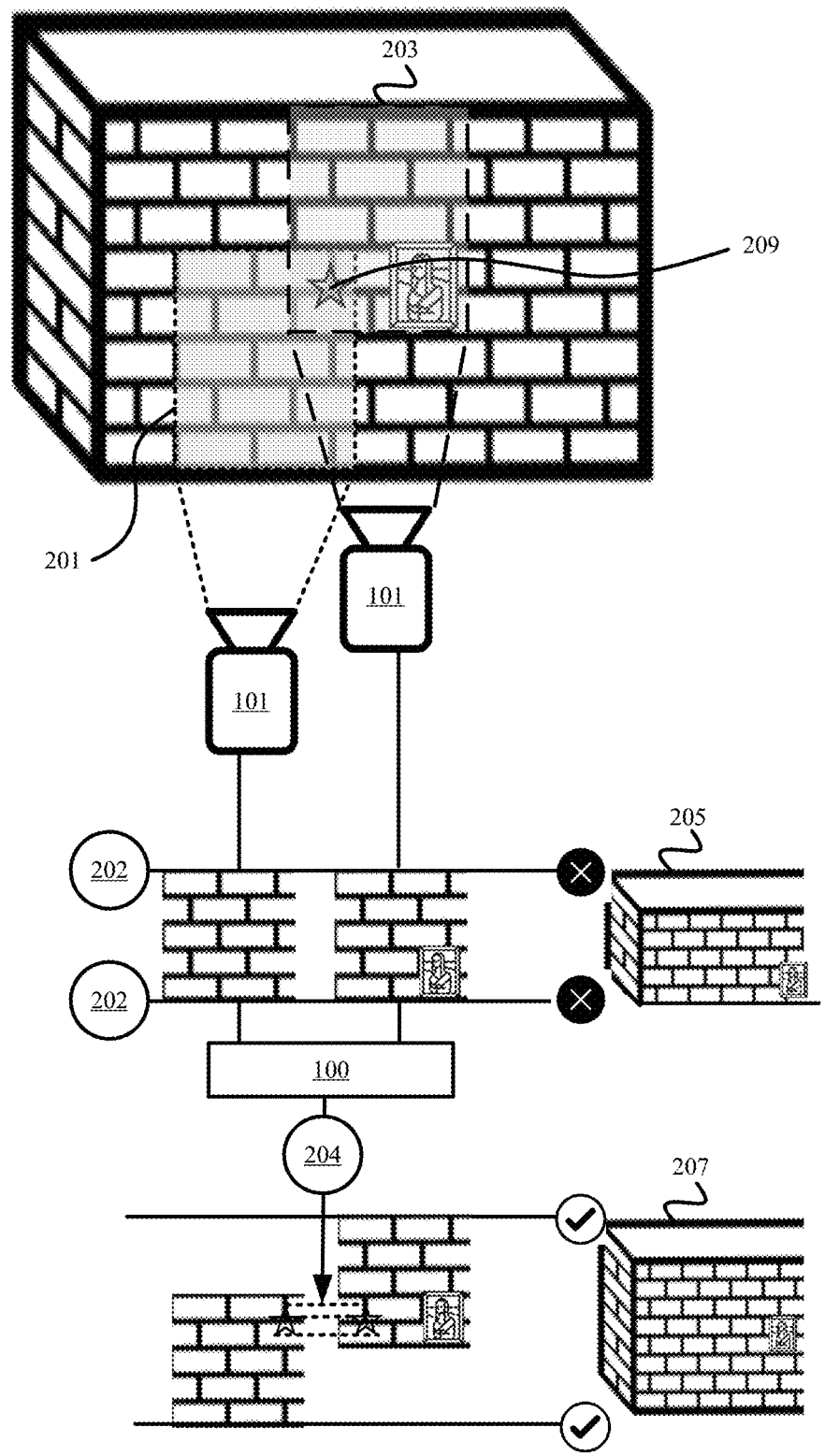
FIG. 2 illustrates an example of using the invisible fiducials to improve alignment between images that have repeating features in accordance with some embodiments.

FIG. 2 illustrates an example of using the invisible fiducials to improve alignment between images that have repeating features in accordance with some embodiments. FIG. 2 illustrates two images 201 and 203 that are taken from different parts of the same brick wall. Despite capturing different parts of the same brick wall, images 201 and 203 appear to be identical. Each image 201 and 203 has the same features appearing with the same pattern. Accordingly, relying only on the same repeating features may result in images 201 and 203 being misaligned (at 202) relative to one another and/or other images of the brick wall resulting in composite image 205 of the scene having an incorrect geometry.

Invisible fiducial 209 introduces a unique non-repeating identifiable reference point that does not interfere with or distort the capture of the brick wall in either image 201 and 203, that is not visibly apparent in images 201 and 203. Image generation system 100 detects invisible fiducial 209 in specific wavelengths or bands of the electromagnetic spectrum that do change the visible color characteristics in each image 201 and 203. Image generation system 100 aligns (at 204) invisible fiducial 209 in images 201 and 203 and/or other images of the brick wall to achieve an exact and pixel-for-pixel alignment of the overlapping portions of images 201 and 203 despite the overlapping portions having the same repeating features. Image generation system 100 generates composite image 207 by combining the data from aligned images 201 and 203 and/or other images of the scene into one image.

Figure 3:
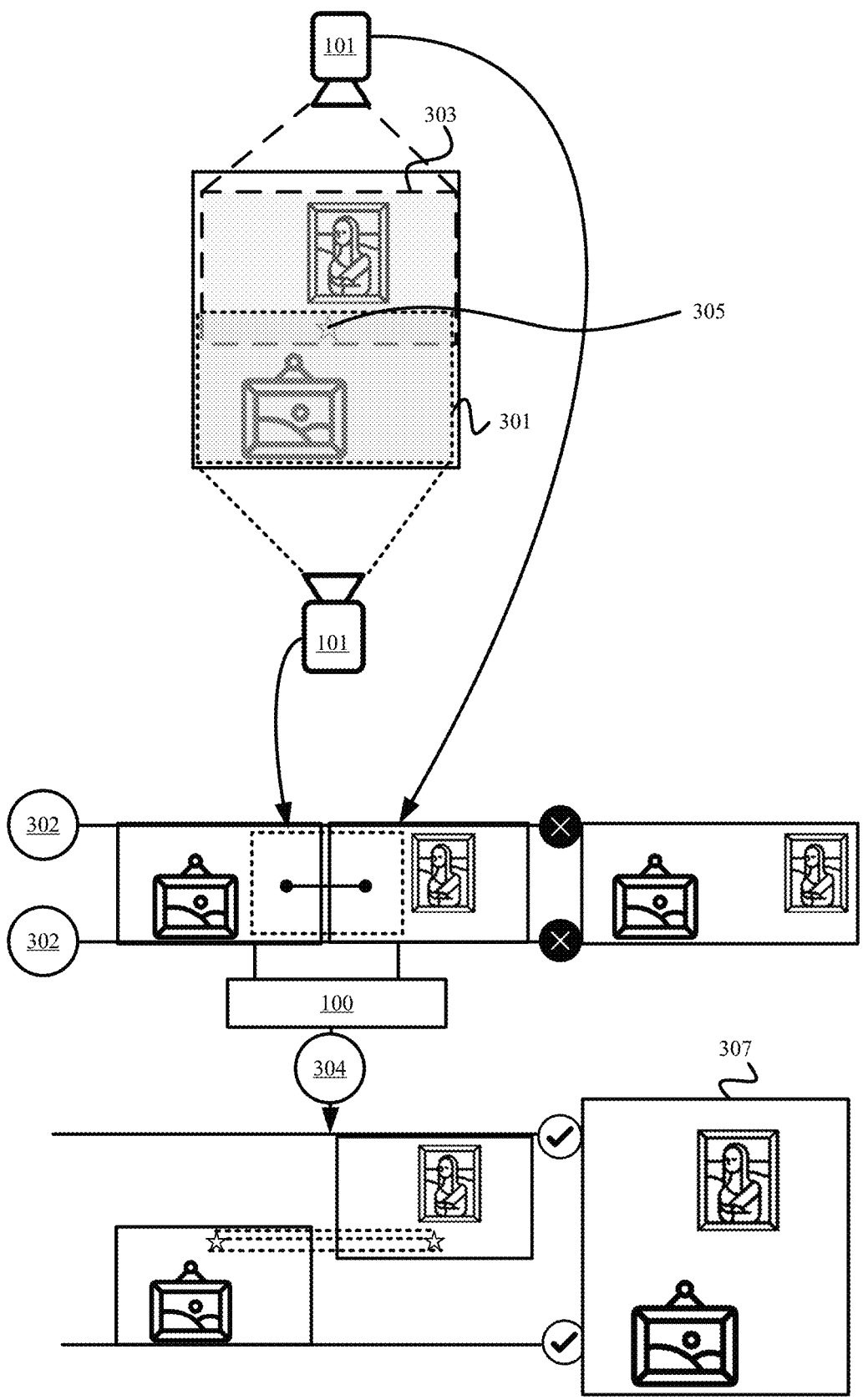
FIG. 3 illustrates an example of using the invisible fiducials to improve alignment between images that have a uniform feature or pattern in accordance with some embodiments.

FIG. 3 illustrates an example of using the invisible fiducials to improve alignment between images that have a uniform feature or pattern in accordance with some embodiments. FIG. 3 illustrates two images 301 and 303 that are taken from different parts of a mostly uniform wall with two paintings. Images 301 and 303 cannot be accurately aligned (at 302) based on the visual features alone due to the overlapping parts of images 301 and 303 lacking unique and/or differentiating visible features.

Invisible fiducial 305 introduces a unique non-repeating identifiable reference point that does not interfere with or distort the capture of the mostly uniform wall in either image 301 and 303. Image generation system 100 aligns (at 304) invisible fiducial 305 found in the overlapping parts of images 301 and 303 to achieve an exact and pixel-for-pixel alignment of the overlapping portions of images 301 and 303 despite the overlapping portions of image 301 and 303 having no unique structure features or coloring. Image generation system generates composite image 307 based on data that is merged from aligned (at 304) images 301 and 303 and/or other aligned scans or images taken of the scene.

As noted above, the invisible fiducials allow for the perfect alignment of the scans or images without interfering with or distorting the structural or positional capture of different surfaces or the visible color attributes of the surfaces captured in the cans or images or the resulting composite image. Visible fiducials such as Quick Response ("QR") codes, visual patterns, and/or other visible identifiers in the form of stickers or other tags that are placed over a section of the scene create gaps at those sections in the captured scans or images and the resulting composite image. Specifically, visible fiducials cover or obscure some section of the imaged scene, preventing imaging devices 101 from accurately measuring the depth over that section or capturing the color across those sections.

The visible fiducials may be removed from the composite image with image editing tools. However, the depth data and color data that was obscured by the visible fiducials are lost, thereby degrading the accuracy and quality of the composite image. This is especially true when the composite image is of a 3D object and gaps are introduced across the non-uniform surface of the 3D object as a result of removing the visible fiducials. The invisible fiducials eliminate any such degradations and preserve the entirety of data across all scanned or imaged surfaces.

Figure 4:
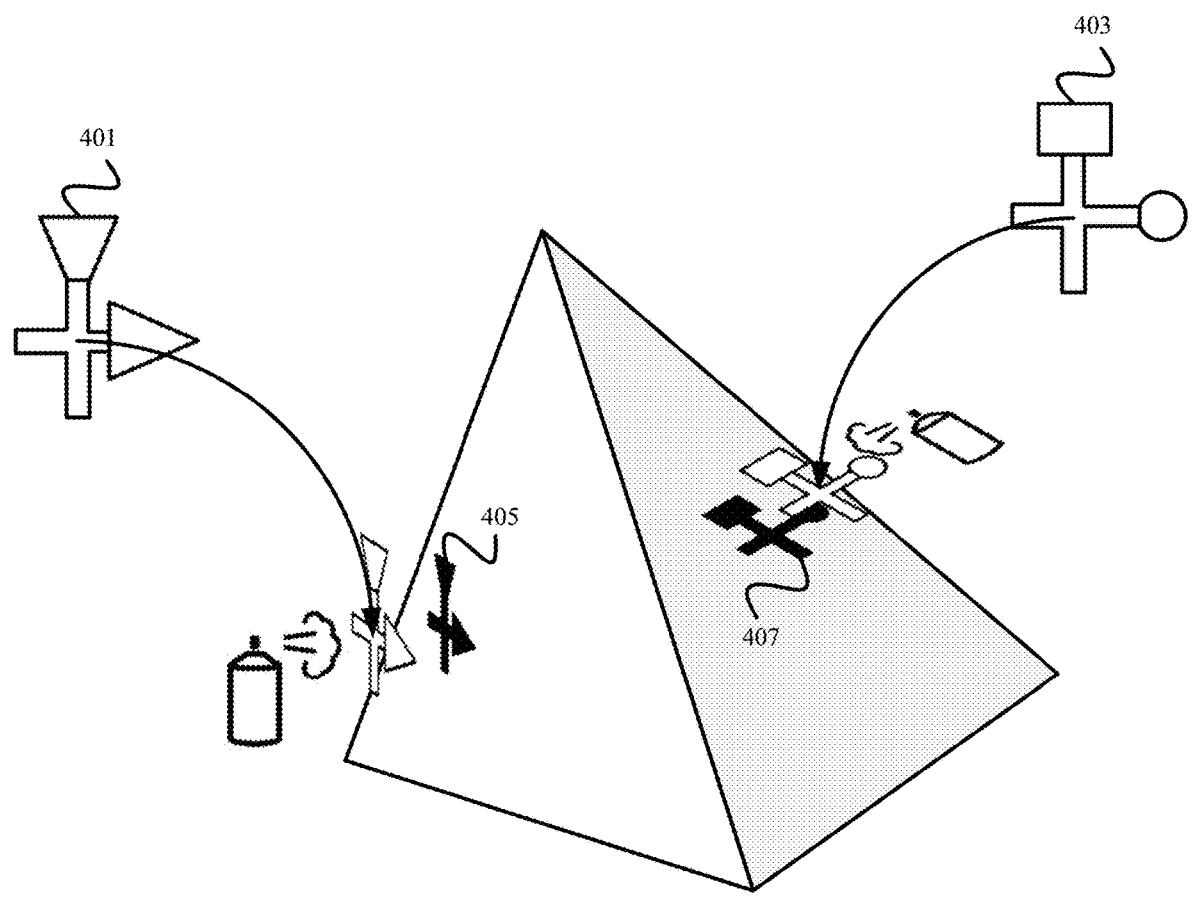
FIG. 4 illustrates an example of applying invisible fiducials to a scene in accordance with some embodiments presented herein.

FIG. 4 illustrates an example of applying invisible fiducials to a scene in accordance with some embodiments presented herein. Different stencils 401 and 403 are used to apply the invisible fiducials 405 and 407 with different unique shapes at different parts of the scene. In some embodiments, the invisible fiducial shape created by each stencil 401 and 403 provides a form for quickly determining the orientation of invisible fiducials 405 and 407 relative to the surface of the object on which each invisible fiducial 405 and 407 is applied. For instance, the invisible fiducial shape differentiates a top of each of invisible fiducial 405 and 407 from the bottom or sides of each invisible fiducial 405 and 407. Consequently, the top, bottom, and sides of the object or surface applied with invisible fiducial 405 or 407 may also be readily determined from the orientation of the applied invisible fiducial 405 or 407. In other words, the differences in shape on the different sides of each invisible fiducial 405 and 407 provide image generation system 100 with reference points for ensuring that images of the same uniform portion of an object are not aligned upside down or incorrectly, and are properly aligned.

The invisible fiducial is a liquid, gel, or other substance that is sprayed, brushed, or otherwise applied onto the surface of an object with a shape that is defined using the different stencils. The liquid, gel, or substance transparently and temporarily adheres over or onto the surface of the object so as to not block, distort, or interfere with the surface texture or coloring. In some embodiments, the liquid, gel, or substance is highly reflective or absorptive of a specific non-visible band of the electromagnetic spectrum. For instance, the liquid, gel, or substance may be highly reflective of specific near-infrared, far-infrared, or ultraviolet bands of the electromagnetic spectrum, wherein a band includes one or more wavelengths that are reactive (e.g., absorptive or reflective) of specific frequencies of non-visible light.

In some embodiments, the invisible fiducial is composed of one or more of a metal oxide layer (e.g., tin oxide, zinc oxide, titanium oxide, etc.) or a plastic layer (e.g., ethylene tetrafluoroethylene) that provide the transparent reflectance or absorption of specific infrared or ultraviolet bands without blocking the visible light bands of the electromagnetic spectrum. In some embodiments, the invisible fiducial is a resin or pigment that includes calcined alumina, oxybenzone, octinoxate, cinoxate, dioxybenzone, and/or other chemicals that are highly reflective or absorptive of specific wavelengths or bands of the electromagnetic spectrum.

In some embodiments, stencils 401 and 403 are placed over a projector or other device that emits the specific non-visible band of the electromagnetic spectrum at which the invisible fiducials are detected. In some such embodiments, the projector is aimed at the one or more desired surfaces of the scene where the invisible fiducials are to be applied, and stencils 401 and 403 form the emitted specific non-visible band of the electromagnetic spectrum being projected from the projector onto the desired surfaces with the desired form or unique shape of the invisible fiducials.

Applying the invisible fiducials with a defined shape is performed to reduce the detection of false positives. For instance, the object being scanned or imaged may have one or more surfaces that are of the same or similar reflective material as the invisible fiducials, and may produce similar intensity values as surfaces that are treated or coated with the invisible fiducials. Image generation system 100 differentiates between the invisible fiducials and the surfaces with the same reflective or absorptive material based on the shape formed by the intensity values that are in range of the reflective or absorption expected from the invisible fiducials in certain bands of the electromagnetic spectrum.

Figure 5:
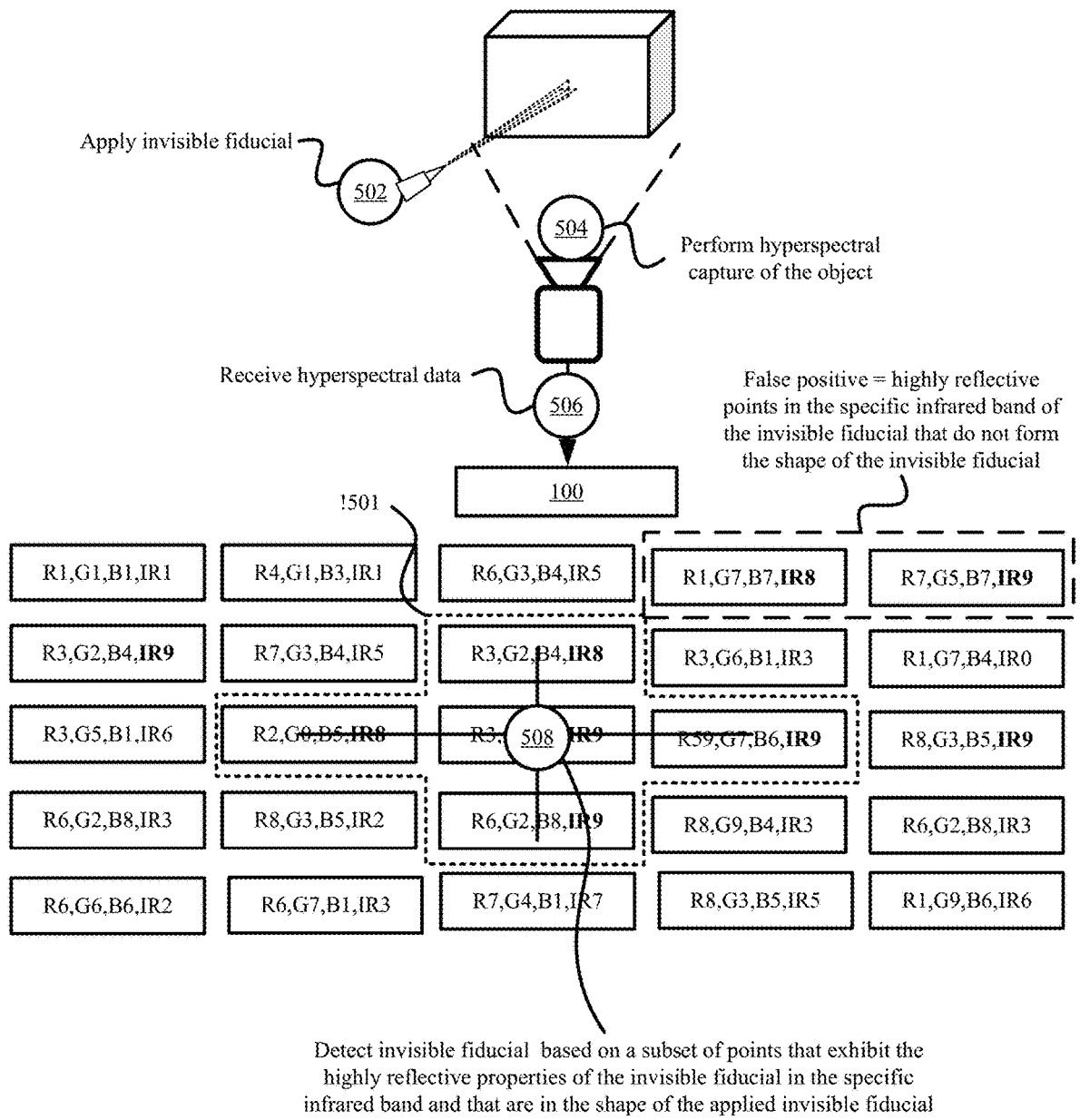
FIG. 5 illustrates an example of using the invisible fiducial shape to eliminate invisible fiducial false positives and to differentiate from surfaces that have similar reflective or absorptive properties as an invisible fiducial in accordance with some embodiments presented herein.

FIG. 5 illustrates an example of using the invisible fiducial shape to eliminate invisible fiducial false positives and to differentiate from surfaces that have similar reflective or absorptive properties as an invisible fiducial in accordance with some embodiments presented herein. As shown in FIG. 5, the invisible fiducial is applied (at 502) as a cross shape onto the surface of an object with a projector.

An imaging device is used to perform (at 504) a hyperspectral capture of the object. Performing (at 504) the hyperspectral capture involves measuring RGB visible light bands as well as a specific infrared band that is associated with the invisible fiducial. Specifically, the invisible fiducial is highly reflective of the specific infrared band or projects with the cross shape onto the surface of the object with high reflectivity in the specific infrared band and without affecting reflectivity or intensity values in other bands or wavelengths of the electromagnetic spectrum.

Image editing system 100 receives (at 506) the hyperspectral values measured by the imaging device across the surface of the object, and analyzes the values for the specific infrared band to identify a set of points across the object surface that are highly reflective in the specific infrared band and therefore exhibit properties of the invisible fiducial. However, image editing system 100 eliminates false positives by discarding the points that are highly reflective in the specific infrared band but that are not in the shape or form of the invisible fiducial. Image editing system 100 determines (at 508) that the subset of points 501 exhibit the highly reflective properties of the invisible fiducial in the specific infrared band and also are in the shape of the applied invisible fiducial, and therefore detects the position of the invisible fiducial to correspond to the position of the subset of points 501 in the captured image or scan of the object.

Image generation system 100 detects the invisible fiducials in different scans or images and aligns the scans and images based on the size and orientation of the invisible fiducials in order to generate various composite items. In some embodiments, image generation system 100 generates a 2D panoramic image from stitching together the aligned images, a 3D image or point cloud from a photogrammetry processing of aligned 2D images, a complete 3D image or point cloud from merging 3D data from aligned scans of the same scene, object, or environment from different positions, and/or a complete 3D image or point cloud from combining 3D positional data from one or more 3D scans with color data from one or more 2D images that are aligned with one another and the one or more 3D scans based on the invisible fiducials. The invisible fiducials do not block, obscure, or create gaps in any part of the generated composite image because the invisible fiducials coexist with and do not interfere with the positional data or image data anywhere in the scans or images used to generate the composite image.

Figure 6:
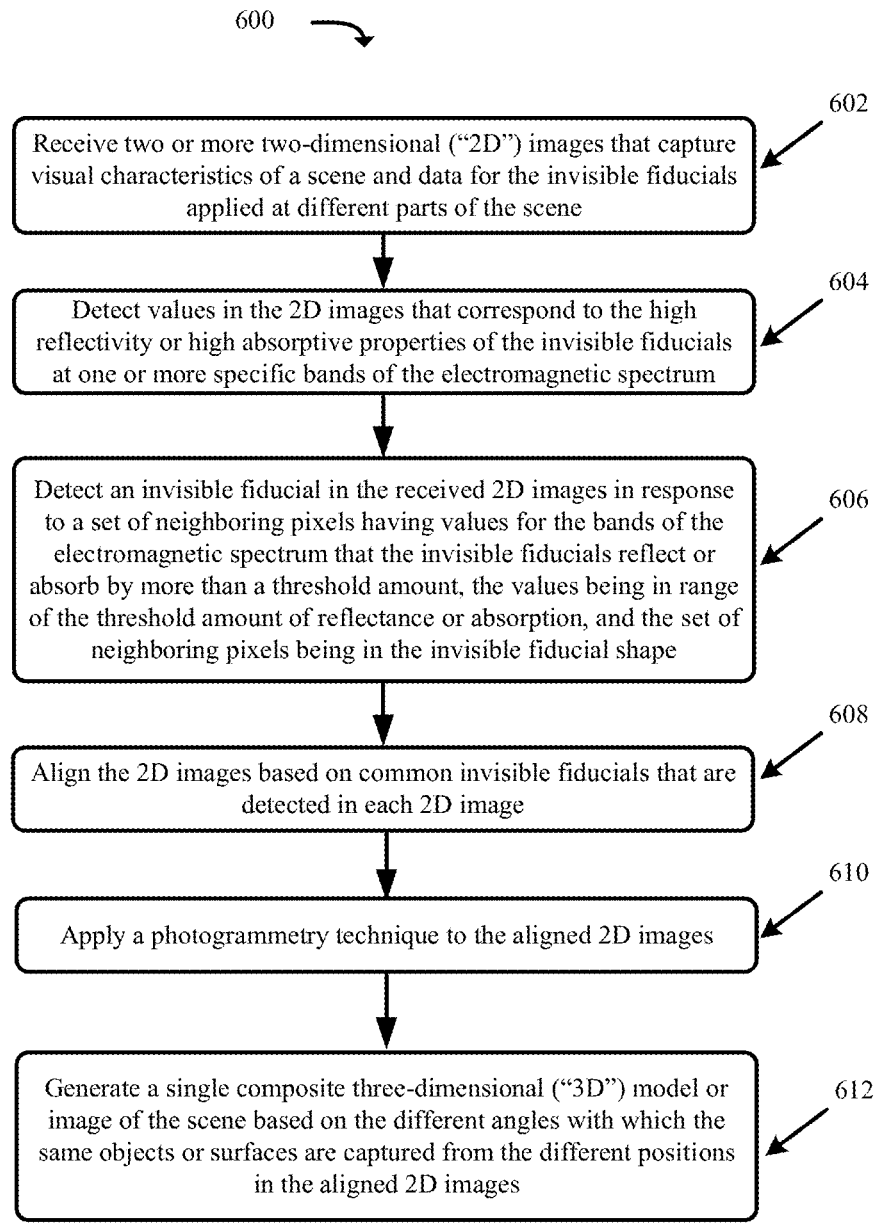
FIG. 6 presents a process for using the invisible fiducials to align two-dimensional ("2D") images for improved photogrammetry modeling of a three-dimensional ("3D") object images in accordance with some embodiments presented herein.

FIG. 6 presents a process 600 for using the invisible fiducials to align 2D images for improved photogrammetry modeling of a 3D object images in accordance with some embodiments presented herein. Process 600 is implemented by image generation system 100. Image generation system 100 includes at least one device or machine with one or more hardware processors and/or other compute resources for digital image creation, viewing, and/or editing.

Process 600 includes receiving (at 602) two or more 2D images that capture visual characteristics (e.g., coloring) for overlapping and non-overlapping parts of a particular scene from different positions, and that also capture the data for the invisible fiducials at the corresponding parts of the imaged scene where the invisible fiducials were applied. In other words, the visible characteristics are represented with a different set of values and data elements than the invisible fiducials, or the invisible fiducials may be represented as one of several data elements used to capture the visual characteristics. The two or more 2D images may be generated by one or more cameras and/or other imaging devices that are located at the different positions, and may be provided to image generation system 100 over a network or via a storage medium.

Process 600 includes detecting (at 604) values in the 2D images that correspond to the high reflectivity or high absorptive properties of the invisible fiducials at one or more specific bands of the electromagnetic spectrum. For instance, image generation system 100 detects (at 604) intensity measurements captured for the one or more specific bands that are greater than a first threshold defined according to an expected amount of light reflecting off the invisible fiducials in the one or more specific bands or less than a second threshold defined according to an expected amount of light being absorbed by the invisible fiducials in the one or more specific bands.

In some embodiments, the received (at 602) 2D images provide a hyperspectral capture of the scene. The hyperspectral capture includes values measured in two or more bands of the electromagnetic spectrum that are used to generate the visualization and/or coloring of the scene, and at least one other band of the electromagnetic spectrum that the invisible fiducials reflect or absorb by more than a threshold amount. The invisible fiducials are not reactive to and do not alter light in the two or more bands of the electromagnetic spectrum that are used to generate the visualization and/or coloring of the scene, but are highly reactive to light in the at least one other band that is not used to generate the visual characteristics of the scene. For instance, the two or more bands include the RGB bands, and the at least one other band includes an infrared or ultraviolet band. Accordingly, the 2D images may be encoded with pixels that have RGB values and a fourth value for the intensity measured in the at least one other band. Detecting (at 604) the invisible fiducial values includes determining if the fourth value is in a first range of values expected for a highly reflective invisible fiducial or is in a second range of values expected for a highly absorptive invisible fiducial.

In some other embodiments, each of the received (at 602) 2D images is captured with two sets of values from a particular position. For instance, an imaging device is used to perform a first capture of the RGB color components of the scene from the particular position. A filter or lens is applied over the imaging device to block the RGB color components while allowing light in the one or more bands that the invisible fiducials reflect or absorb onto the imaging device sensor, and the imaging device is used to perform a second capture of the one or more bands for the invisible fiducials. The values from the first capture and the second capture may be encoded in the same image file received (at 602) by image generation system 100.

In still some other embodiments, the raw mosaic values that define the received (at 602) 2D images include measurements for different RGB wavelengths. For instance, the color red is formed from the wavelengths between 600 and 710 nanometers, and the raw mosaic values of the received (at 620) 2D images may include a first measurement for a first red color component in wavelengths between 620-630 nanometers, a second measurement for a second red color component in wavelengths between 660-670 nanometers, and a third measurement for a third red color component in wavelengths between 700-710 nanometers. The invisible fiducials may be formulated to reflect or may or may have reflective properties that reflect only the wavelengths between 620-630 nanometers making up the second red color component. Accordingly, detecting (at 604) the invisible fiducial values includes identifying pixels with outlying values (e.g., values greater than a threshold defined based on the invisible fiducial reflective properties) in the wavelengths between 620-630 nanometers. In some such embodiments, image generation system 100 may discard the first measurement and may generate the color red from the second and third measurements for pixels that also include an invisible fiducial, and may generate the color red from the first, second, and third measurements for pixels that do not include an invisible fiducial. In this manner, the invisible fiducials may be embedded or encoded as part of the color data of the images without significantly altering the color data.

Process 600 includes detecting (at 606) an invisible fiducial in the received (at 602) 2D images in response to a set of neighboring pixels having values for the bands of the electromagnetic spectrum that the invisible fiducials reflect or absorb by more than a threshold amount, the values being range of the threshold amount of reflectance or absorption, and the set of neighboring pixels being in the defined shape of an invisible fiducial. The shape detection eliminates false positives or the incorrect classification of invisible fiducials for surfaces that are captured with values that match the high reflectivity or high absorptive of the invisible fiducials but that do not have a unique shape of an invisible fiducial. In some embodiments, image generation system 100 is configured with the unique shapes of invisible fiducials, and image generation system 100 compares the structure, shape, and/or positioning of the set of neighboring pixels, that have the reflective or absorptive values for the one or more specific bands, to the configured unique shapes of the invisible fiducials. An invisible fiducial is detected (at 606) in response the structure, shape, and/or positioning of the set of neighboring pixels being similar to a defined shape by a threshold amount or percentage.

Process 600 includes aligning (at 608) the 2D images based on common invisible fiducials that are detected (at 606) in each 2D image. Aligning (at 608) includes identifying the same invisible fiducials in two or more of the images, transforming the two or more images so that the invisible fiducials have a common orientation and/or size, and positioning the transformed two or more images so that the invisible fiducials are perfectly aligned in each image. In some embodiments, transforming the two or more images includes rotating, skewing, resizing, and/or otherwise shifting the images according to the sizing and orientation of the same invisible fiducial in two or more images being aligned. In some embodiments, transforming the two or more images includes adjusting the overlap between two or more images so that the pixels corresponding to the same invisible fiducial in the two or more images are perfectly aligned.

In some embodiments, image generation system 100 identifies the same invisible fiducial in different images when each invisible fiducial applied to the scene has a unique shape or form. In some other embodiments, image generation system 100 identifies the same invisible fiducial in different images based on other image data associated with the pixels representing the invisible fiducial. For instance, image generation system 100 identifies the same invisible fiducial when a first set of pixels that have the reflective values and shape of a particular invisible fiducial in a first image also have the same or similar RGB color values as a second set of pixels that have the reflective values and shape of the particular invisible fiducials in a second image. Similarly, image generation system 100 identifies a different invisible fiducial when a third set of pixels that have the reflective values and shape of the particular invisible fiducial in the first image do not have the same or similar RGB color values as the second set of pixels in the second image.

Process 600 includes applying (at 610) a photogrammetry technique to the aligned 2D images, and generating (at 612) a single composite 3D model or image of the scene based on the different angles with which the same objects or surfaces are captured from the different positions in the aligned 2D images. The geometry of the composite 3D model is an accurate representation of the actual imaged object because of the precision with which the invisible fiducials align the 2D images. Moreover, the colors of the composite 3D model are directly mapped from the 2D images without any gaps, blocked regions, or interference created by the invisible fiducials. In other words, image generation system 100 removes the data for the invisible fiducials from the single composite 3D model without losing geometry or color data in any of the aligned 2D images or in any part of the composite 3D model.

Figure 7:
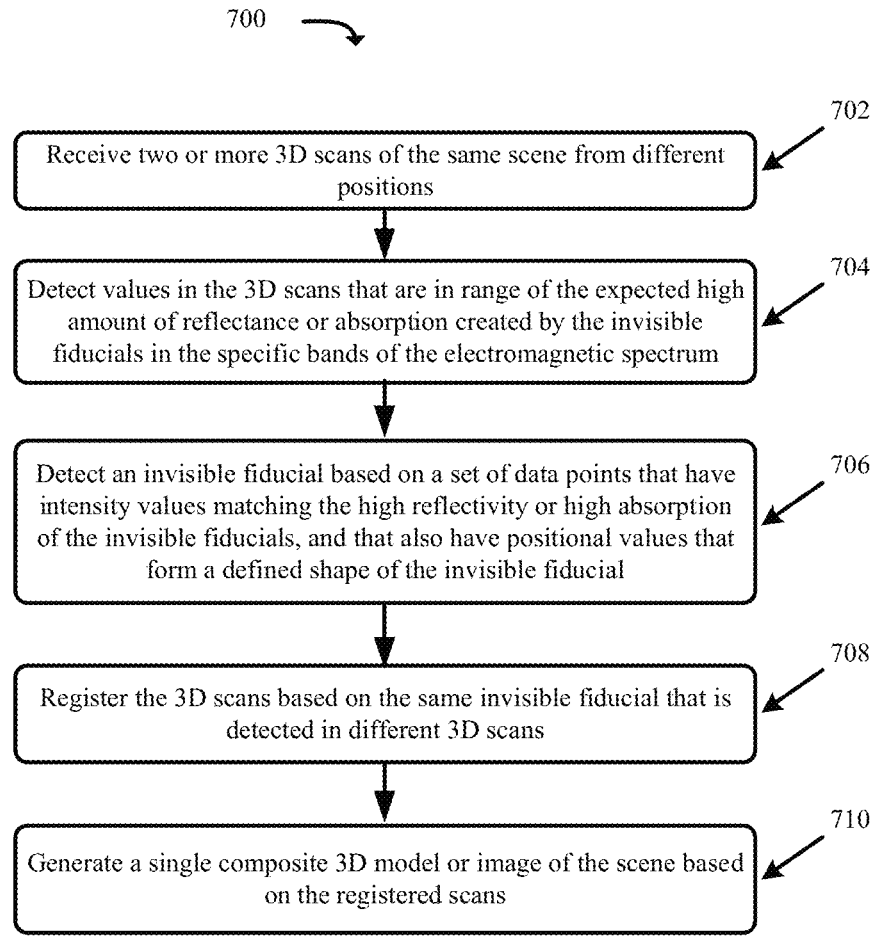
FIG. 7 presents a process for generating a single composite 3D image from registering different scans of a scene using the invisible fiducials in accordance with some embodiments presented herein.

FIG. 7 presents a process 700 for generating a single composite 3D image from registering different scans of a scene using the invisible fiducials in accordance with some embodiments presented herein. Process 700 is implemented by image generation system 100.

Process 700 includes receiving (at 702) two or more 3D scans of the same scene from different positions. Each scan captures the positioning of points across different surfaces of the scene that are exposed to a scanner at one of the different position. The point or surface positioning is represented as a set of x, y, and z coordinate values. Each scan may be encoded as a point cloud with a data point that is created in a 3D space based on the position of a corresponding point detected on the surface of the scene by the scanner.

Process 700 includes detecting (at 704) values in the 3D scans that are in range of the expected high amount of reflectance or absorption created by the invisible fiducials in the one or more specific bands of the electromagnetic spectrum. In some embodiments, the scanners determine the position of points based on the time-of-flight and/or other characteristics of the lasers, lights, sound, and/or other signaling that are emitted and reflected back to the scanner. Additionally, the scanners record the return intensity associated with each detected point such that each data point has an x, y, and z positional value and a return intensity value. The invisible fiducials are formulated to be highly reflective or highly absorptive of the signals emitted by the scanner. Accordingly, the return intensity associated with surfaces having the invisible fiducial coating will have a significantly greater or lower intensity value than the return intensity associated with surfaces that do not have the invisible fiducial coating.

Process 700 includes detecting (at 706) an invisible fiducial in the received (at 702) 3D scans. Detecting (at 706) the invisible fiducials in the 3D scans involves identifying a set of data points that have intensity values matching the high reflectivity or high absorption of the invisible fiducials, and that also have positional values that form a defined shape of one invisible fiducial.

Process 700 includes registering (at 708) the 3D scans based on the same invisible fiducial that is detected (at 706) in different 3D scans. Registering (at 708) the 3D scans includes identifying the data points that represent the same invisible fiducial (e.g., data points that have similar relative positional values and that have intensity values corresponding to the high reflectivity or high absorption of the invisible fiducial) in different 3D scans, and aligning one 3D scan with another 3D scan by aligning the data points representing the same invisible fiducial in the different 3D scans. In some embodiments, registering (at 708) the 3D scans involves aligning the 3D scans using the data points that represent the same invisible fiducials in the 3D scans, and mapping the positional values of the data points from the different 3D scans to a common 3D space or coordinate system. Once the scans are aligned and the positional values are mapped to the common 3D space or coordinate system, the data points from the different 3D scans are merged into a single space or coordinate system. Accordingly, registering (at 708) the 3D scans includes merging data points from different point clouds into a single point cloud so that data points that are part of a first point cloud but not a second point cloud and data points that are part of the second point cloud but not the first point cloud are combined with exact positioning in a common space to comprehensively capture all surfaces of an object or scene from different sides.

Process 700 includes generating (at 710) a single composite 3D model or image of the scene based on the registered scans. Generating (at 710) the single composite 3D model or image includes rendering the data points from the aligned 3D scans to produce a single 3D visualization of the scene. The geometry and positioning of each surface and/or each object of the scene in the 3D model and 3D visualization matches on an individual point basis to the actual scanned points of those surfaces and/or objects from the scene based on the precise alignment performed using the invisible fiducials. Moreover, the invisible fiducials do not create any occlusions, gaps, or distortions in the 3D model or the 3D visualization since the invisible fiducials do not prevent the scanner or imaging device from accurately capturing the positioning and coloring of the points or surfaces where the invisible fiducials are applied.

Figure 8:
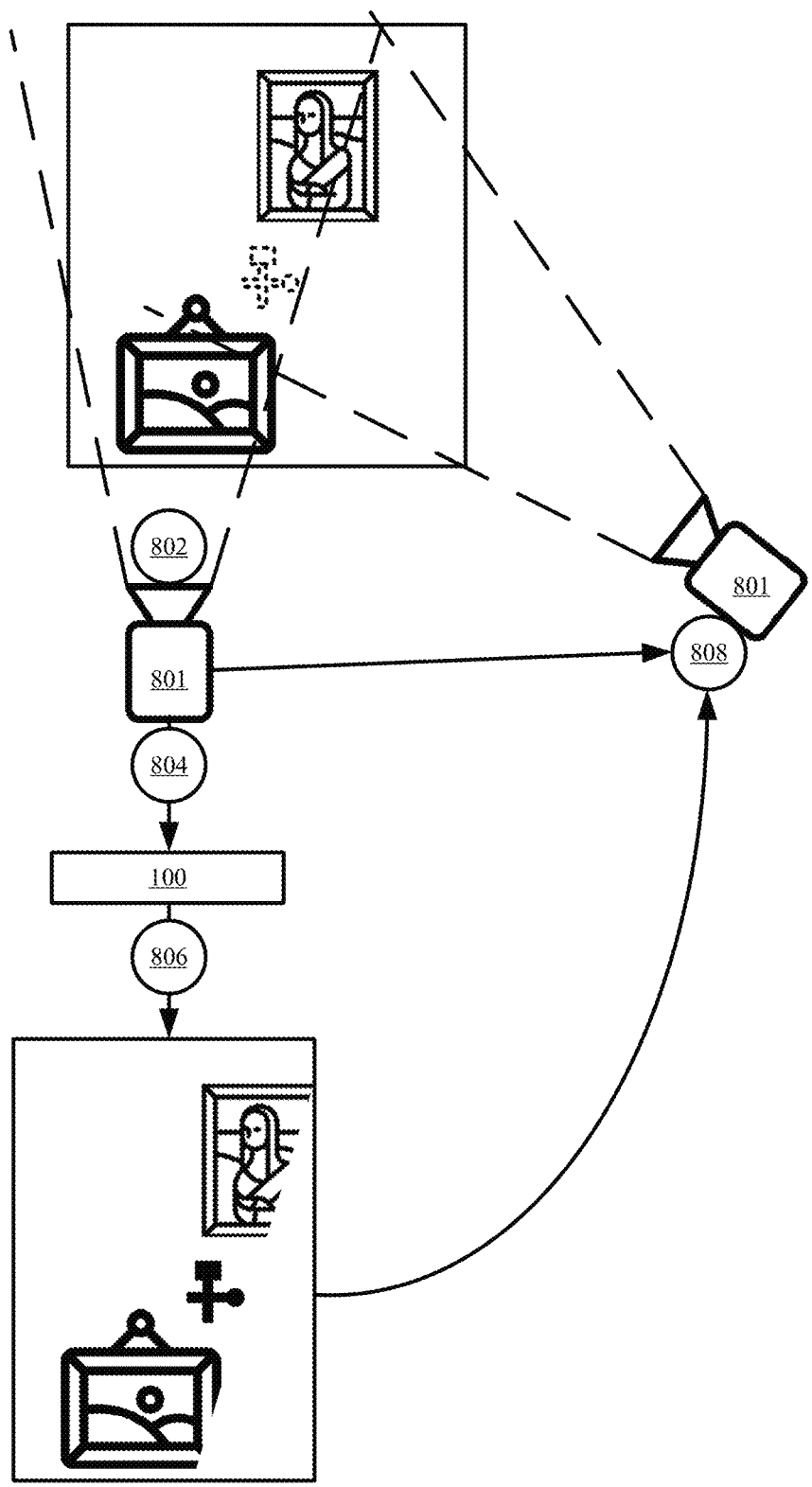
FIG. 8 illustrates an example of providing a live view of the invisible fiducials in accordance with some embodiments presented herein.

In some embodiments, image generation system 100 provides a live view of the invisible fiducials during scanning or imaging of a scene to assist a user in completely capturing the scene with sufficient overlap and one or more invisible fiducials in different scans or images that may be used to produce the single composite image. FIG. 8 illustrates an example of providing the live view of the invisible fiducials in accordance with some embodiments presented herein.

Image generation system 100 is connected to imaging device 801. Imaging device 801 is used to scan or image a scene. In some embodiments, image generation system 100 is connected to multiple imaging devices when multiple imaging devices are used to scan or image the scene. For instance, imaging generating system 100 may be connected to a first scanner that is positioned to scan the scene from a first position and a second scanner that is positioned to scan the scene from a second position. Alternatively, image generation system 100 may be connected to a scanner that is used to generate a positional scan of the scene and a camera that is used to capture color components of the scene.

Imaging device 801 performs (at 802) a first capture of the scene from a first position. Image generation system 100 receives (at 804) the first capture, and processes the first capture to detect one or more invisible fiducial within the scene. In some embodiments, image generation system 100 receives a continual feed from imaging device 801, and processing the scans or images received from imaging device 801.

Image generation system 100 generates (at 806) a visualization of the first capture and the invisible fiducial detected within the first capture data. Generating (at 806) the visualization involves converting the invisible fiducial into a visible fiducial, and presenting the visible fiducial over the part of the captured image or scan that corresponds to the detected position of the invisible fiducial. In some embodiments, generating (at 806) the visualization includes overlaying a visualization of the invisible fiducial onto the live view or viewfinder of imaging device 801.

The user references the visualization in setting up a second capture of the scene. Specifically, the user repositions (at 808) imaging device 801 while referencing the created visualization to ensure that the invisible fiducial from the first capture is within second capture. Accordingly, the live view with the visualized invisible fiducials ensures that there is sufficient overlap between the first capture and the second capture, and that there is a unique identifying feature in the overlapping region that image generation system 100 uses to generate a single composite image from the different captures.

Without the live view that generates a visualization of the invisible fiducial in a scene that has a repeating or uniform pattern, the user may lose track of which portions of the scene have been imaged and which portions have not been imaged. Moreover, without the live view, the user may capture the scene from different positions that exclude the invisible fiducial such that image generation system 100 has no unique point of reference against which to align the different captures. The misalignment may then create a distorted composite image with inaccurate geometry and/or mapping of color data. However, with the visualization of the invisible fiducials in the live view, the user can correct the amount of overlap between different capture to ensure that the unique reference point provided by the invisible fiducial is in two captures.

The live view also allows the user to orient the second capture relative to the first capture. For instance, the live view present the specific orientation of the invisible fiducial so that the user may orient imaging device 801 to take the second capture with the same specific orientation. Performing the captures with the same orientation reduces computational effort by image generation system 100 to align the images and provides a consistent capture of the positional data and/or color data that may be skewed if taken from a different position and with a different orientation, height, etc.

Figure 9:
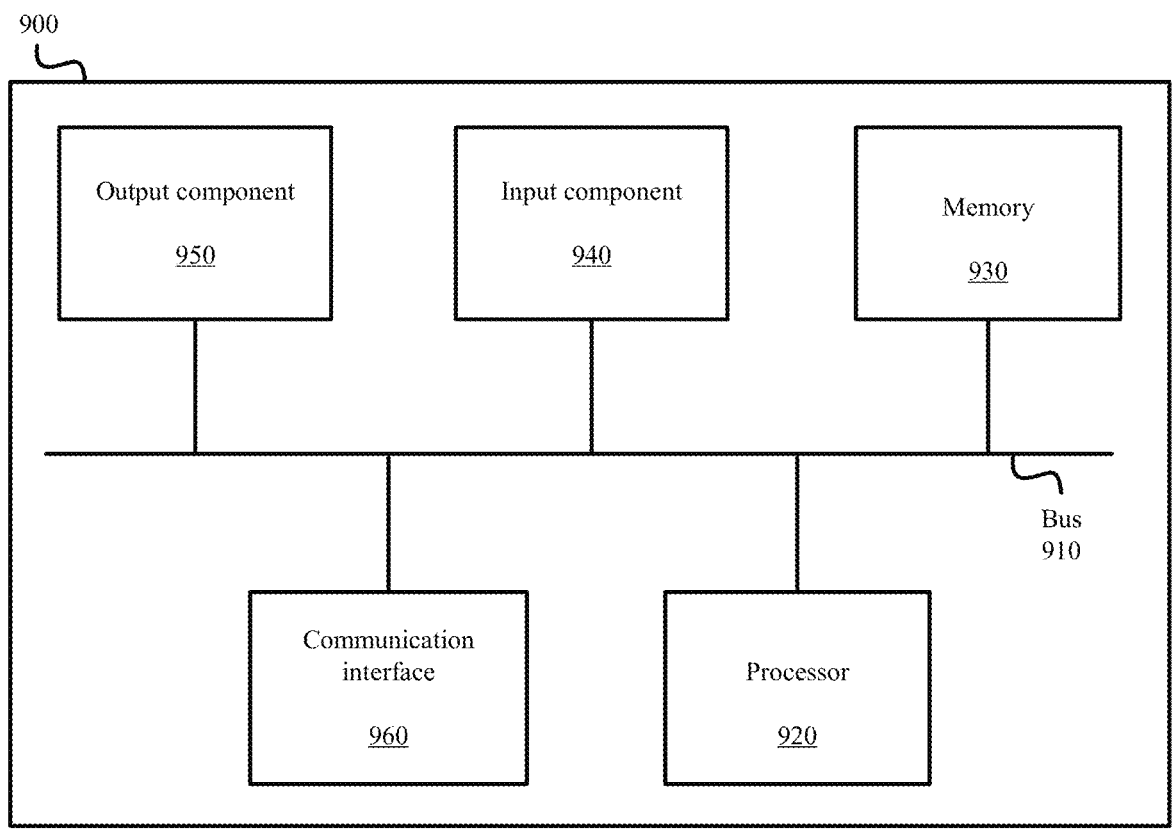
FIG. 9 illustrates example components of one or more devices, according to one or more embodiments described herein.

FIG. 9 is a diagram of example components of device 900. Device 900 may be used to implement one or more of the devices or systems described above (e.g., image generation system 100, the imaging devices, etc.). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more LEDs, etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of messages, blocks, and/or signals have been described with regard to some of the above figures, the order of the messages, blocks, and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

The invention claimed is:

1. A method comprising:
receiving, from a first device, positional measurements for a plurality of points about one or more surfaces of an object and an intensity with which a particular spectral band reflects off of each point of the plurality of points;
receiving, from a second device, color measurements for the plurality of points and an intensity with which the particular spectral band reflects off of each point of the plurality of points;
determining that the intensity with which the particular spectral band reflects off of a first set of neighboring points and a second set of neighboring points from the plurality of points in the positional measurements and in the color measurements exceeds a threshold;
detecting an invisible fiducial that is represented by the second set of neighboring points in the positional measurements and in the color measurements in response to the second set of neighboring points forming a particular shape of the invisible fiducial and the first set of neighboring points forming a shape that differs from the particular shape of the invisible fiducial;
aligning the particular shape of the invisible fiducial represented by the second set of neighboring points in the color measurements to the particular shape of the invisible fiducial represented by the second set of neighboring points in the positional measurements;
constructing a three-dimensional ("3D") model of the object by generating primitives in a 3D space according to the positional measurements and by defining colors of the primitives based on the color measurements that are aligned with the positional measurements that are used to generate the primitives;
removing the invisible fiducial from the 3D model by excluding the intensity with which the particular spectral band reflects off of the plurality of points from said generating of the primitives and said defining of the colors; and
presenting the 3D model without the invisible fiducial interfering with the colors or form of a part of the object represented by the second set of neighboring points in response to removing the invisible fiducial from the 3D model.

2. The method of claim 1 further comprising:
applying the invisible fiducial on the second set of neighboring points, wherein applying the invisible fiducial comprises placing a transparent material that is highly reflective of the particular spectral band with the particular shape on the second set of neighboring points or projecting one or more wavelengths associated with the particular spectral band in the particular shape on the second set of neighboring points.

3. The method of claim 1, wherein receiving the color measurements comprises:
receiving measurements for a first wavelength, a second wavelength, and a third wavelength reflecting off each point of the plurality of points, wherein the first wavelength is associated with a first color and a first spectral band, wherein the second wavelength is associated with a second color and a second spectral band, and wherein the third wavelength is outside a visible spectrum and is used to define the invisible fiducial.

4. The method of claim 1 further comprising:
receiving the particular shape of the invisible fiducial;
determining a first arrangement of the first set of neighboring points and a second arrangement of the second set of neighboring points based on positions associated with each point of the plurality of points; and
wherein detecting the invisible fiducial comprises:
determining that the first arrangement differs from the particular shape of the invisible fiducial; and determining that the second arrangement matches the particular shape of the invisible fiducial.

5. The method of claim 1 further comprising:
receiving the particular shape of the invisible fiducial;
comparing different shapes formed by the first set of neighboring points and the second set of neighboring points to the particular shape of the invisible fiducial based on the intensity with which the particular spectral band reflects off the first set of neighboring points and the second set of neighboring points exceeding the threshold; and
wherein detecting the invisible fiducial comprises:
determining that the first set of neighboring points corresponds to an invisible fiducial false positive based on an arrangement of the first set of neighboring points differing from the particular shape of the invisible fiducial; and
determining that the second set of neighboring points represent the invisible fiducial based on an arrangement of the second set of neighboring points forming the particular shape of the invisible fiducial.

6. The method of claim 1, wherein aligning the particular shape of the invisible fiducial comprises:
transforming one or more of the positional measurements or the color measurements received for the plurality of points until the positional measurements or the color measurements received for the second set of neighboring points representing the invisible fiducial have a particular size or orientation.

7. The method of claim 1, wherein aligning the particular shape of the invisible fiducial comprises:
adjusting one or more of a size or orientation of the plurality of points with the positional measurements until the first set of neighboring points with the positional measurements match a size or orientation of the second set of neighboring points with the color measurements.

8. A system comprising:
one or more hardware processors configured to:
receive, from a first device, measurements for a plurality of points about one or more surfaces of an object and an intensity with which a particular spectral band reflects off of each point of the plurality of points;
receive, from a second device, color measurements for the plurality of points and an intensity with which the particular spectral band reflects off of each point of the plurality of points;
determine that the intensity with which the particular spectral band reflects off of a first set of neighboring points and a second set of neighboring points from the plurality of points in the positional measurements and in the color measurements exceeds a threshold;
detect an invisible fiducial that is represented by the second set of neighboring points in the positional measurements and in the color measurements in response to the second set of neighboring points forming a particular shape of the invisible fiducial and the first set of neighboring points forming a shape that differs from the particular shape of the invisible fiducial;
align the particular shape of the invisible fiducial represented by the second set of neighboring points in the color measurements to the particular shape of the invisible fiducial represented by the second set of neighboring points in the positional measurements;
construct a three-dimensional ("3D") model of the object by generating primitives in a 3D space according to the positional measurements and by defining colors of the primitives based on the color measurements that are aligned with the positional measurements that are used to generate the primitives;
remove the invisible fiducial from the 3D model by excluding the intensity with which the particular spectral band reflects off of the plurality of points from said generating of the primitives and said defining of the colors; and
present the 3D model without the invisible fiducial interfering with the colors or form of a part of the object represented by the second set of neighboring points in response to removing the invisible fiducial from the 3D model.

9. The system of claim 8, wherein the one or more hardware processors are further configured to:
apply the invisible fiducial on the second set of neighboring points, wherein applying the invisible fiducial comprises placing a transparent material that is highly reflective of the particular spectral band with the particular shape on the second set of neighboring points or projecting one or more wavelengths associated with the particular spectral band in the particular shape on the second set of neighboring points.

10. The system of claim 8, wherein receiving the color measurements comprises:
receiving measurements for a first wavelength, a second wavelength, and a third wavelength reflecting off each point of the plurality of points, wherein the first wavelength is associated with a first color and a first spectral band, wherein the second wavelength is associated with a second color and a second spectral band, and wherein the third wavelength is outside a visible spectrum and is used to define the invisible fiducial.

11. The system of claim 8, wherein the one or more hardware processors are further configured to:
receive the particular shape of the invisible fiducial;
determine a first arrangement of the first set of neighboring points and a second arrangement of the second set of neighboring points based on positions associated with each point of the plurality of points; and
wherein detecting the invisible fiducial comprises:
determining that the first arrangement differs from the particular shape of the invisible fiducial; and
determining that the second arrangement matches the particular shape of the invisible fiducial.

12. The system of claim 8, wherein the one or more hardware processors are further configured to:
receive the particular shape of the invisible fiducial;
compare different shapes formed by the first set of neighboring points and the second set of neighboring points to the particular shape of the invisible fiducial based on the intensity with which the particular spectral band reflects off the first set of neighboring points and the second set of neighboring points exceeding the threshold; and
wherein detecting the invisible fiducial comprises:
determining that the first set of neighboring points corresponds to an invisible fiducial false positive based on an arrangement of the first set of neighboring points differing from the particular shape of the invisible fiducial; and
determining that the second set of neighboring points represent the invisible fiducial based on an arrangement of the second set of neighboring points forming the particular shape of the invisible fiducial.

13. A non-transitory computer-readable medium storing program instructions that, when executed by one or more hardware processors of an image generation system, cause the image generation system to perform operations comprising:

receiving, from a first device, positional measurements for a plurality of points about one or more surfaces of an object and an intensity with which a particular spectral band reflects off of each point of the plurality of points;

receiving, from a second device, color measurements for the plurality of points and an intensity with which the particular spectral band reflects off of each point of the plurality of points;

determining that the intensity with which the particular spectral band reflects off of a first set of neighboring points and a second set of neighboring points from the plurality of points in the positional measurements and in the color measurements exceeds a threshold;

detecting an invisible fiducial that is represented by the second set of neighboring points in the positional measurements and in the color measurements in response to the second set of neighboring points forming a particular shape of the invisible fiducial and the first set of neighboring points forming a shape that differs from the particular shape of the invisible fiducial;

aligning the particular shape of the invisible fiducial represented by the second set of neighboring points in the color measurements to the particular shape of the invisible fiducial represented by the second set of neighboring points in the positional measurements;

constructing a three-dimensional ("3D") model of the object by generating primitives in a 3D space according to the positional measurements and by defining colors of the primitives based on the color measurements that are aligned with the positional measurements that are used to generate the primitives;

removing the invisible fiducial from the 3D model by excluding the intensity with which the particular spectral band reflects off of the plurality of points from said generating of the primitives and said defining of the colors; and presenting the 3D model without the invisible fiducial interfering with the colors or form of a part of the object represented by the second set of neighboring points in response to removing the invisible fiducial from the 3D model.

* * * * *